Patented June 10, 1947

2,421,831

UNITED STATES PATENT OFFICE 2,421,831

SINGLE STAGE PRODUCTION OF GAS EXPANDED RUBBER

Alfred Cooper, Croydon, England, assignor to Rubatex Products, Inc., New York, N. Y., a corporation of Delaware No Drawing. Application March 4, 1943, Serial No. 477,992. In Great Britain February 10, 1941

5 Claims. (Cl. 260—724)

This invention is concerned with the production of gas expanded (closed cell) rubber and it is one object of the invention to provide a simpler process obviating the necessity for using high pressure apparatus and of introducing intermediate steps for the purpose of partially vulcanizing and expanding the material.

It is well known in the manufacture of expanded rubber to incorporate in the rubber mix a substance or a mixture of substances (known as a blowing agent) which, on heating, will form a gas and in order to obtain a closed cell structure, it has been usual in such processes to heat the rubber mix just sufficiently to partially vulcanize the material, during which process there is not only a partial vulcanization but a partial expansion of the material due to the fact that the blowing agent has commenced to function and produce gas within the rubber material. Such a process is described in Patent No. 2,299,593 issued October 20, 1942. It has been necessary to carry out this intermediate heating step under pressure or restriction of the material to avoid the escape of gas from the rubber before the latter is sufficiently vulcanized to retain it. The material is then submitted to a final vulcanization temperature, during which operation the material is further expanded to the final form required.

The present invention enables the rubber mix to be taken from the sheeting rolls and after a short standing, to be placed directly into the final vulcanization moulds and heated to the final vulcanizing temperature, i. e. the entire expansion taking place in one step. It is also found that the elimination of the intermediate steps does away with many irregularities in production and enables a more uniform product to be produced.

According to the present invention, a process for the production of gas expanded rubber comprises incorporating in a vulcanizable rubber mix a vulcanization accelerator and a substance or mixture of substances (blowing agent) which, on heating, will by decomposition, volatilization or interaction form a gas; the accelerator being sufficiently active at temperatures below that at which the blowing agent forms the gas to enable the rubber to retain said gas when the mix is heated to the final vulcanization temperature; and thereafter without any intermediate gassing operation enclosing the unexpanded rubber mix in a mould of dimensions sufficient to permit of the desired expansion of the material, heating it to the final vulcanizing temperature and finally cooling before opening the mould.

It is to be understood that the term rubber as used in this specification and the appended claims is intended to include the various synthetic products which are at present used as rubber substitutes and may be vulcanized in an analogous way to natural rubber.

One convenient way of carrying out the invention is to masticate raw rubber and incorporate after the mastication the various ingredients to form the mix, including the blowing agent, but preferably leaving the sulphur out until the other ingredients are homogeneously incorporated and thereupon after the sulphur has been incorporated, calendering the material to the desired thickness according to the dimensions and density of the final product to be produced, and then allowing the calendered material to remain in the calendering cloth for a period sufficient to produce a semi-vulcanization. After this, it is only necessary to weigh out sufficient of the calendered material so that after expansion in the final vulcanization mold, it will completely fill the mold, and then to enclose it in the mold and carry out the final vulcanization operation as hitherto. Similarly, instead of calendering the material, it may be extruded into rods or tubes and then be cut up into the required weight for molding.

If the blowing agent employed is one which produces a gas readily soluble in the unvulcanized rubber when the gas is evolved in appreciable quantities within the rubber, a large volume thereof percolates through or finds its way out of the rubber and only a small percentage is actually used for forming the cells. It has therefore been found advantageous to choose less soluble gases for producing the cells and nitrogen has been largely employed in this respect. A suitable blowing agent for producing nitrogen is diazoaminobenzene which breaks up during the heating necessary for the final vulcanization with the formation of nitrogen. The nitrogen may similarly be produced by a mixture of sodium nitrite and ammonium chloride in equi-molecular proportions. Hydrogen may be produced e. g. by a mixture of oleic acid and zinc powder. The principal requirements of the blowing agent are that the gas produced should be sparingly soluble in the rubber and the blowing agent should not reach its effective blowing power until a temperature just below the final vulcanization temperature is reached.

A large number of vulcanization accelerators may be used. The benzothiazole derivatives which are semi-ultra fast in action are suitable in that they allow a sufficient time of rest for the material in between the calendering and the final vulcanizing. Other accelerators suitable for the purpose of the present invention are the thiuram sulphides including tetramethylthiuram monosulphide and disulphide, dipentamethylene thiuram tetrasulphide and disulphide, while the salts of dithio acids provide a useful range and may include zinc dimethyl dithiocarbanate and the corresponding salts in which the dimethyl group is replaced by diethyl, dibutyl, and pentamethylene respectively, zinc butylxanthate, zinc and sodium isopropylxanthate, piperidine pentamethylene dithiocarbanate and piperidine monocarbathionalate. These can be used either on their own and in combination with one another to produce the desired acceleration. All the foregoing may be used without any heating of the material beyond that which is generated in the mixing operation, though heat may be applied so long as the temperature attained is not sufficient to cause the blowing agent to form gas. The following is an example of one way in which the invention can be carried into effect:

|  | Parts |
| --- | --- |
| Raw rubber | 100 |
| Zinc oxide | 5–10 |
| Stearic acid | 10–20 |
| Mercapto benzothiazole | 0.1–0.3 |
| Sulphur | 2–3 |
| Diazoaminobenzene | 2–3 |

The raw rubber is masticated for approximately 30 minutes, then the ingredients are added, leaving the sulphur to the very last; the material is then calendered to a suitable thickness and allowed to remain in the calendering cloth for a period of 20 to 30 minutes, during which the semi-vulcanization takes place. On removal from the calendering cloth, the material is placed into curing frames for vulcanizing in a steam- or electrically-heated press, or else placed into molds suitably clamped down for curing in the hot air oven, the amount of material placed in the frame or mold being calculated to allow room for the expansion necessary to give the required density of the material. There is no intermediate process of gas absorption by means of high pressure. The cellular structure is formed by virtue of the pre-vulcanization, without which ordinary sponge rubber would be obtained in the final vulcanization. The final vulcanization may be effected in any of the well known ways. Thus the molds containing the required amount of calendered material may be either heated in hot air or steam- or electrically-heated press as above described, or the clamped down molds may be immersed in water, oil, glycerine, or other fluid heated to the required temperature according to the acceleration employed.

The above mix will produce a soft cellular rubber and in order to produce expanded ebonite the same proportions may be adhered to, with the exception that the sulphur will be increased to 40–50 parts. The vulcanizing period in the press for the soft material is approximately one hour at 50 lbs. per square inch of steam in the platens, and in the case of expanded ebonite it should be one hour at 100 lbs. per square inch of steam in the platens. In both cases cold water should be allowed to circulate through the press platens before the articles are removed, as otherwise the cells will burst and sponge rubber will be produced.

In order to ensure obtaining a uniform expansion of the rubber, several factors must be carefully inter-related, as will be apparent to those skilled in the art. Thus, the degree of breakdown of the crude rubber, the use of softeners in the compounded mix and the balance between the type of blowing agent, the rates of blowing and curing must all be taken into account, in order that the gas will be uniformly formed and distributed throughout the mass and then fixed in position by the curing of the rubber. Different blowing agents yield up their gas at different temperatures and at different rates of evolution so that the apparent density, compressibility, size of pores, absence of surface depressions and pits and many other factors are affected wholly or partly by the blowing agent selected.

Many variations of the art herein described should now be obvious to those skilled in the art. Accordingly, I prefer to be bound not by the specific disclosures herein, but only by the appended claims.

I claim:

1. A process for the production of gas expanded rubber which comprises incorporating in a vulcanizable rubber mix a vulcanization accelerator and a blowing agent which, on heating, will form a gas; the accelerator being sufficiently active at room temperature and below that at which the blowing agent forms the gas to partially vulcanize the rubber to enable the rubber to retain the said gas when the mix is heated to the final vulcanization temperature; and thereafter, without any intermediate gassing operation enclosing the unexpanded rubber mix in a mold of dimensions sufficient to permit of the desired expansion of the material, heating it to the final vulcanization temperature and finally cooling before opening the mold.

2. A process for the production of gas expanded rubber which comprises incorporating in a vulcanizable rubber mix a vulcanization accelerator and a blowing agent which, on heating, will form a gas; the accelerator being sufficiently active at room temperature and below that at which the blowing agent forms the gas to partially vulcanize the rubber to enable the rubber to retain the said gas when the mix is heated to the final vulcanization temperature; and thereafter, without any intermediate gassing operation enclosing the unexpanded rubber mix in a mold of dimensions sufficient to permit of the desired expansion of the material, heating it to the final vulcanization temperature and finally cooling before opening the mold, the accelerator and blowing agent being first incorporated into the rubber mix before the vulcanization agent is included in the mix and the vulcanizing agent being added after the other ingredients are homogeneously mixed together and just prior to the further working up of the material.

3. A process for the production of gas expanded rubber which comprises incorporating in a vulcanizable rubber mix a vulcanization accelerator and a blowing agent which, on heating will form a gas; the accelerator being sufficiently active at temperatures below that at which the blowing agent forms the gas to enable the rubber to retain the said gas when the mix is heated to the final vulcanization temperature; and thereafter, without any intermediate gassing operation enclosing the unexpanded rubber mix in a mold of dimensions sufficient to permit of the desired expansion of the material, heating it to the final vulcanization temperature and finally cooling before opening the mold; the accelerator and blowing agent being first incorporated into the rubber mix before the vulcanization agent is included in the mix and the vulcanizing agent being added after the other ingredients are homogeneously mixed together and just prior to the further working up of the material, the mix containing the vulcanization agent, accelerator and blowing agent being calendered into a sheet and allowed to stand at room temperature until sufficiently vulcanized to retain the gas liberated in the final vulcanization operation.

4. A process for the production of gas expanded rubber which comprises incorporating in a vulcanizable rubber mix a vulcanization accelerator and diazoaminobenzene which, on heating, will form a gas; the accelerator being sufficiently active at room temperature and below that at which the diazoaminobenzene forms the gas to enable the rubber to retain the said gas when the mix is heated to the final vulcanization temperature; and thereafter, without any intermediate gassing operation enclosing the unexpanded rubber mix in a mold of dimensions sufficient to permit of the desired expansion of the material, heating it to the final vulcanization temperature and finally cooling before opening the mold.

5. A process for the production of gas expanded rubber which comprises incorporating in a vulcanizable rubber mix a vulcanization accelerator and a blowing agent which, on heating, will form a gas; the accelerator being sufficiently active at room temperature and below that at which the blowing agent forms the gas to enable the rubber to retain the said gas when the mix is heated to the final vulcanization temperature; and thereafter, without any intermediate gassing operation enclosing the unexpanded rubber mix in a mold of dimensions sufficient to permit of the desired expansion of the material, heating it to the final vulcanization temperature, the accelerator and blowing agent being first incorporated into the rubber mix before the vulcanization agent is included in the mix and the vulcanizing agent being added after the other ingredients are homogeneously mixed together and just prior to the further working up of the material.

ALFRED COOPER.

REFERENCES CITED

The following references are of record in the file of this patent:

UNITED STATES PATENTS

| Number | Name | Date |
|---|---|---|
| 1,717,168 | Noar | June 11, 1929 |
| 2,019,489 | Flemming | Nov. 5, 1935 |
| 2,158,083 | Peel | May 16, 1939 |
| 2,271,498 | Overstreet | Jan. 27, 1942 |
| 2,299,593 | Roberts | Oct. 20, 1942 |